(12) United States Patent
Kanda et al.

(10) Patent No.: US 7,219,640 B2
(45) Date of Patent: May 22, 2007

(54) VARIABLE AIR INDUCTION APPARATUS

(75) Inventors: Tsuyoshi Kanda, Obu (JP); Yoshichika Yamada, Kuwana (JP); Taisuke Murata, Obu (JP); Yasutoshi Kameda, Toyota (JP); Akira Nakawatase, Toyota (JP)

(73) Assignees: DENSO Corporation, Kariya, Aichi-pref. (JP); Toyota Jidosha Kabushiki Kaisha, Toyota, Aichi-pref. (JP)

( * ) Notice: Subject to any disclaimer, the term of this patent is extended or adjusted under 35 U.S.C. 154(b) by 0 days.

(21) Appl. No.: 11/408,159

(22) Filed: Apr. 21, 2006

(65) Prior Publication Data

US 2006/0236971 A1    Oct. 26, 2006

(30) Foreign Application Priority Data

Apr. 21, 2005   (JP)   ............................. 2005-123427

(51) Int. Cl.
*F02M 35/10*   (2006.01)
(52) U.S. Cl. ............................. 123/184.55; 123/184.53

(58) Field of Classification Search ........... 123/184.53, 123/184.55
See application file for complete search history.

(56) References Cited

U.S. PATENT DOCUMENTS 6,073,601 A * 6/2000 Guichard et al. ...... 123/184.55

FOREIGN PATENT DOCUMENTS

| JP | 2002-147299 | 5/2002 |
| JP | 2002-256874 | 9/2002 |

* cited by examiner

*Primary Examiner*—Noah P. Kamen
(74) *Attorney, Agent, or Firm*—Nixon & Vanderhye P.C.

(57) ABSTRACT

In a variable air induction apparatus, a valve element is switched between one side to open a first air intake passage and close a second air intake passage, and the other side to open the second air intake passage and to close the first air intake passage. The first air intake passage and the second air intake passage have lengths different from each other. The valve element is fixed on a shaft member to rotate integrally with the shaft. A driving device applies a driving force to rotate the shaft member. An urging device urges the shaft member to rotate the valve element to be switched to any one of the one side and the other side.

5 Claims, 3 Drawing Sheets

VARIABLE AIR INDUCTION APPARATUS

CROSS REFERENCE TO RELATED APPLICATION

This application is based upon and claims the benefit of priority of Japanese Patent Application No. 2005-123427 filed on Apr. 21, 2005, the content of which is incorporated herein by reference.

FIELD OF THE INVENTION

The present invention relates to a variable air induction apparatus for an internal combustion engine, especially for switching between a long and a short air intake passages.

BACKGROUND OF THE INVENTION

Variable air induction apparatuses are conventionally used to improve a torque of an internal combustion engine by varying a length of an air intake passage in accordance with a number of revolutions of the internal combustion engine. In these variable air induction apparatus, the length of the air intake passage is increased when the number of revolutions of the internal combustion engine is relatively small, and the length of the air intake passage is decreased when the number of revolutions of the internal combustion engine is relatively large, to improve the torque of the internal combustion engine.

In a variable air induction apparatus disclosed in JP-2002-147299-A, for example, a valve element is installed in a short air intake passage to open and close the short air intake passage. When a long air intake passage is used, the valve element closes the short air intake passage. When the short air intake passage is used, the valve element opens the short the air intake passage.

In another variable air induction apparatus disclosed in JP-2002-256874-A, a valve element is located at a connection portion of a short air intake passage and a long air intake passage. When the long air intake passage is used, the valve element opens the long air intake passage and closes an end portion of the short air intake passage. When the short air intake passage is used, the valve element closes an end portion of the long air intake passage and opens the short air intake passage.

However, in the variable air induction apparatus disclosed in JP-2002-147299-A, the valve element closes only the short air intake passage, so that the long air intake passage is opened at all times, regardless of the number of revolutions of the internal combustion engine. Thus, while the valve element is opening the short air intake passage for using the short air intake passage, the intake air flows not only in the short air intake passage but also in the long air intake passage. As a result, undesirable intake air pulsation occurs not only in the short air intake passage but also in the long air intake passage, to decrease an air intake efficiency.

In the variable air induction apparatus disclosed in JP-2002-256874-A, while one of the short air intake passage and the long air intake passage is opened, the other of them is closed, so that undesirable intake air pulsation does not occur, not to decrease the air intake efficiency. However, in the variable air induction apparatuses with a construction to open the one of the short and long air intake passages and to close the other of them as disclosed in JP-2002-256874-A, the valve element has a cantilever construction that rotates around a supporting point at one end side thereof. The valve element with the cantilever construction is much affected by the pulsation of the intake air flowing in the air intake passages. Thus, it is necessary to apply a relatively large force from a driving device to the valve element to keep the valve element at a specific position. This increases a size of the driving device and a size of the variable air induction apparatus.

SUMMARY OF THE INVENTION

The present invention is achieved in view of the above-described issues, and has an object to provide a variable air induction apparatus that can improve an air intake efficiency without increasing a size of a driving device thereof.

The variable air induction apparatus has a housing, a shaft member, a valve element, a driving device and an urging device. A first air intake passage and a second air intake passage are formed in the housing. The first air intake passage and the second air intake passage have lengths different from each other. The shaft member rotates about a longitudinal axis thereof. The valve element is fixed on the shaft member to rotate integrally with the shaft member to be switched between one side to open the first air intake passage and close the second air intake passage and the other side to open the second air intake passage and to close the first air intake passage. The driving device applies a driving force to rotate the shaft member. The urging device urges the shaft member to rotate the valve element to be switched to any one of the one side and the other side.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS (First Embodiment)

Figure 1:
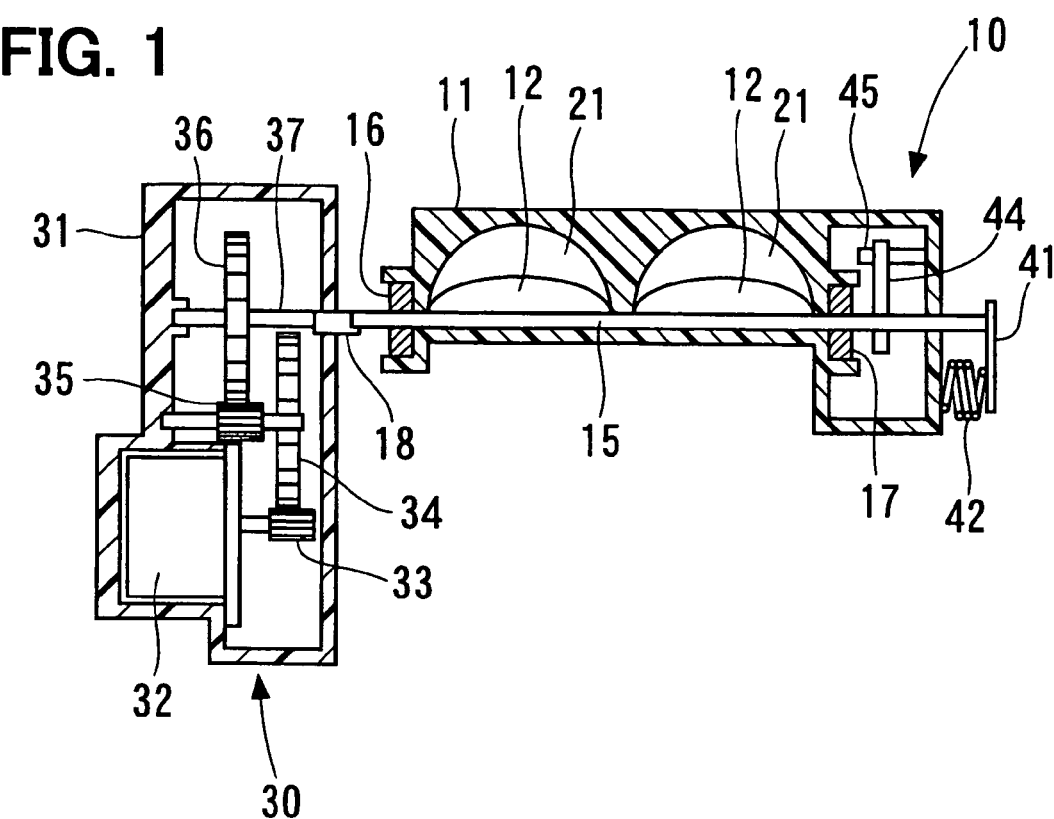
FIG. 1 is a cross-sectional view schematically showing a variable air induction apparatus according to a first embodiment of the present invention, which is taken along a line I—I of FIG. 2.
Figure 2:
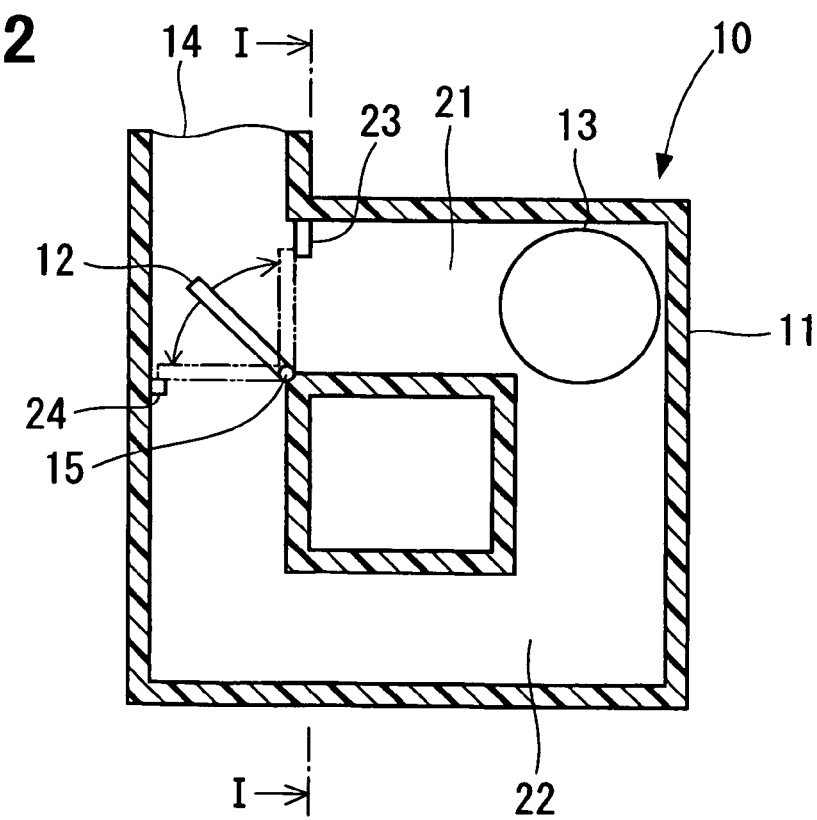
FIG. 2 is a cross-sectional view schematically showing the variable air induction apparatus according to the first embodiment.

A variable air induction apparatus 10 according to a first embodiment of the present invention, which is shown in FIGS. 1 and 2, is installed at an air intake side of a gasoline engine. The variable air induction apparatus 10 is provided with a housing 11, which is formed from a resin, for example and a butterfly valves 12, which corresponds to the valve element according to the present invention. As shown in FIG. 2, the housing 11 forms first air intake passages 21 and second air intake passages 22, which respectively extend from an air inlet 13 to an air outlet 14. The first air intake passages 21 connect the air inlet 13 with the air outlet 14 in distances shorter than the second air intake passages 22 do. The second air intake passages 22 connect the air inlet 13 with the air outlet to detour the first air intake passages 21. That is, an overall length of the first air intake passage 21 is shorter than that of the second air intake passage 22. As shown in FIG. 1, a plurality of the first air intake passages 21 extend in parallel with each other, and a plurality of the second air intake passages 22 extend in parallel with each other. The variable air induction apparatus 10 according to the first embodiment has two first air intake passages 21 and two second air intake passages 22, however, the number of each of the first air intake passage(s) 21 and the second air intake passage(s) 22 may be one, three or greater as demanded. FIG. 1, which is a cross-sectional view taken along a line I—I of FIG. 2, illustrates only a portion of the housing 11 that defines the first air intake passages 21, and does not show the second air intake passages 22 for the sake of simplicity.

The butterfly valves 12 are located at connection portions of the first air intake passages 21 and the second air intake passages 22. The butterfly valves 12 are formed from a resin, for example, into approximately half round shapes as shown in FIG. 1, to fit inner circumferential faces of the first air intake passages 21, which has half cylindrical shapes. As shown in FIG. 2, the half round shaped butterfly valves 12 are connected to the shaft 15 at one end portions in their radial directions. The butterfly valves 12 rotate integrally with the shaft 15 around a rotation axis, which is a center axis of the shaft 15. That is, the butterfly valves 12 of the variable air induction apparatus 10 according to the first embodiment have cantilever constructions to rotate about the center axis of the shaft 15. When the butterfly valves 12 rotate clockwise in FIG. 2 about the shaft 15, the butterfly valves 12 come in contact with stoppers 23 of the housing 11. Thus, the stoppers 23 prevent the butterfly valves 12 from further rotating clockwise in FIG. 2. When the butterfly valves 12 are rotated to come in contact with the stoppers 23, the butterfly valves 12 close one end portions of the first air intake passages 21, which are at a side of the air outlet 14. In the first embodiment, the first air intake passages 21 have half cylindrical shapes, and the butterfly valves 12 have half round plate shapes. However, the first air intake passages 21 and the butterfly valves 12 may have various shapes as demanded.

When the butterfly valves 12 are rotated counterclockwise in FIG. 2 about the rotation axis of the shaft 15, the butterfly valves 21 come in contact with stoppers 24 of the housing 11. Thus, the stoppers 24 prevent the butterfly valves 21 from further rotating counterclockwise in FIG. 2. When the butterfly valves 12 are rotated to come in contact with the stoppers 24, the butterfly valves 12 close one end portions of the second air intake passages 22, which are at the side of the air outlet 14.

The shaft 15 is formed from a resin or a metal to extend in its axial direction as shown in FIG. 1. The shaft 15 is formed integrally with the butterfly valves 12. Bearings 16, 17 rotatably support the shaft 15 on the housing 11. A connection member 18 connects one axial end portion of the shaft 15 to an actuator 30, which corresponds to the driving device and the driving means according to the present invention.

The actuator 30 generates a rotational force to be applied to the shaft 15. The actuator 30 includes a gear box 31 and a motor 32 installed in the gearbox 31. The motor 32 generates a driving force by being supplied with an electric power. A pinion 33 and gears 34, 35, 36 transmit the driving force generated by the motor 32 to a driving shaft 37. The gears 34, 35, 36 decelerate a rotation of the motor 32 and transmit the rotation to the driving shaft 37. The connection member 18 connects the driving shaft 37 with the shaft 15. The driving force of the actuator 30 is transmitted to the shaft 15 in this manner. The motor 32 is supplied with electric power from a control unit (not shown). By controlling the electric power from the control unit to the motor 32, the motor 32 rotates in a normal direction or in a reverse direction. Thus, the butterfly valves 12 rotate clockwise or counterclockwise in FIG. 2.

The shaft 15 has a transmission member 41 at the other end portion opposite from the actuator 30. The transmission member 41 protrudes radially from the shaft 15 and is connected with the shaft 15. A spring 42, which corresponds to the urging member and the urging means according to the present invention, is hooked to the transmission member 41. One end portion of the spring 42 is hooked on the transmission member 41, and the other end portion of the spring 42 is hooked on the housing 11.

Figure 3:
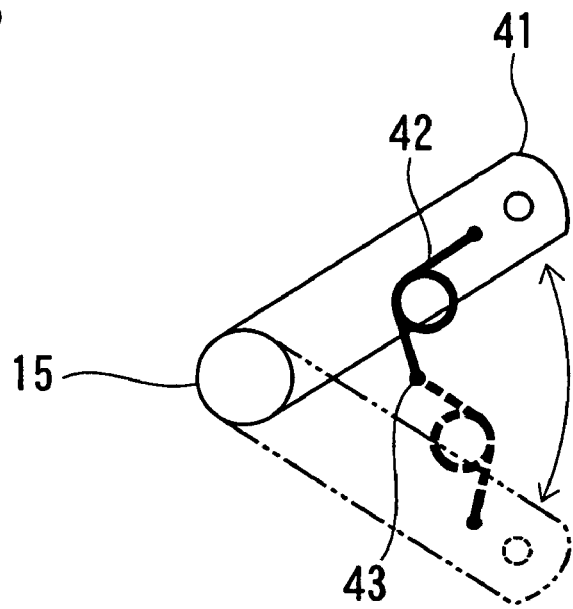
FIG. 3 is a graph schematically showing operations of a transmission member and a spring of the variable air induction apparatus according to the first embodiment.

As shown in FIG. 3, the other end portion of the spring 42, which is opposite from the transmission member 41, is rotatably anchored at an anchor portion 43 of the housing 11. By anchoring the spring 42 rotatably about the anchor portion 43 of the housing 11, urging force characteristics of the spring 42 are reversed at a midpoint shown in FIG. 4, which schematically depicts a relation between an angular position of the butterfly valves 12 and the urging force of the spring 42. A horizontal axis of FIG. 4 indicates an angular position of the butterfly valves 12. As going rightward along the horizontal axis of FIG. 4, the butterfly valves 12 are rotated toward the stoppers 24 at the side of the second air intake passages 22, to increase an opening degree of the first air intake passages 21 and to decrease an opening degree of the second air intake passage 22. As going leftward along the horizontal axis of FIG. 4, the butterfly valves 12 are rotated toward the stoppers 23 at the side of the first air intake passages 21, to increase the opening degree of the second air intake passages 22 and to decrease the opening degree of the first air intake passage 21. A vertical axis of FIG. 4 indicates a direction and a magnitude of the urging force of the spring 42. As going upward along the vertical axis of FIG. 4, the urging force of the spring 42 to urge the butterfly valves 12 to the side to close the first air intake passages 21 increases. As going downward along the vertical axis of FIG. 4, the urging force of the spring 42 to urge the butterfly valves 12 to the side to close the second air intake passages 22 increases. At an intersection of the horizontal axis and the vertical axis of FIG. 4, the butterfly valves 12 are at a midpoint between an angular position to be in contact with the stoppers 23 and an angular position to be in contact with the stoppers 24, and the urging force of the spring 42 is zero.

Figure 4:
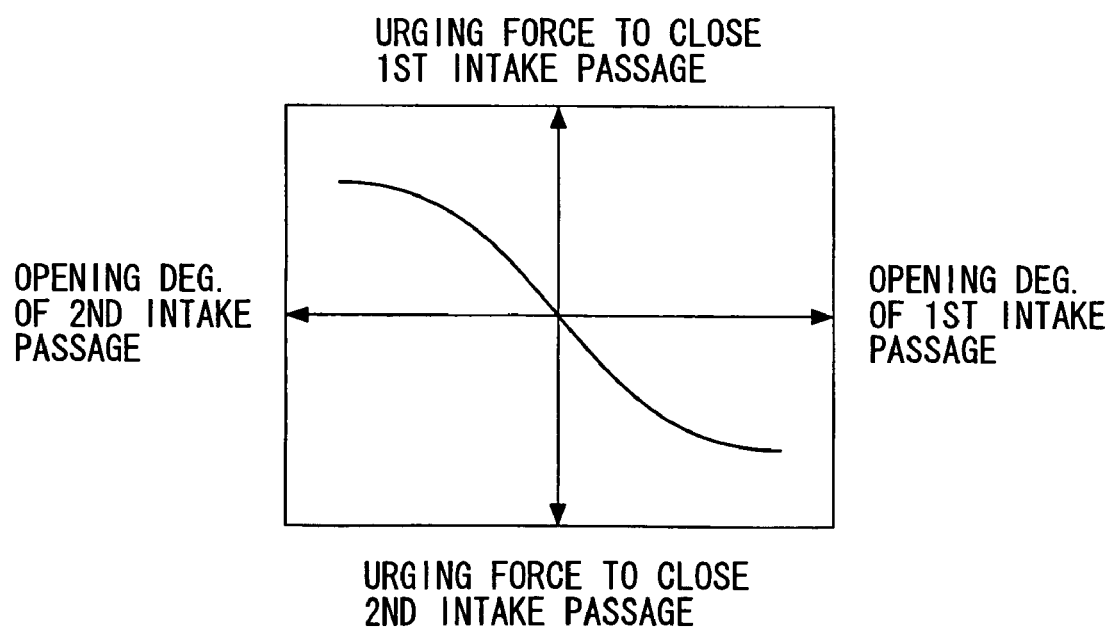
FIG. 4 is a graph schematically showing a relation between an urging force of the spring and an opening degree of a butterfly valve of the variable air induction apparatus according to the first embodiment.

When the butterfly valves 12 are at angles to open the first air intake passages 21, i.e., to close the second air intake passages 22, the spring 42 urges the shaft 15 to keep opening the first air intake passages 21 and to keep closing the second air intake passages 22 in accordance with the characteristics shown in FIG. 4. When the butterfly valves 12 are at angles to open the second air intake passages 22, i.e., to close the first air intake passages 21, the spring 42 urges the shaft 15 to keep opening the second air intake passages 22 and to keep closing the first air intake passages 21. When the butterfly valves 12 are at the midpoint to open the first air intake passages 21 and to open the second air intake passages 22, the urging force of the spring 42 becomes zero.

As shown in FIG. 1, the shaft 15 has a limiter member 44 between the butterfly valves 12 and the transmission member 41 in the axial direction. The limiter member 44 rotates integrally with the shaft 15. An end portion of the limiter member 44, which is opposite from the shaft 15, is arranged to come in contact with a stopper 45, which is installed in the housing 11. The contact of the limiter member 44 with the stopper 45 prevents the shaft 15 from further rotating, together with the stoppers 23, 24, which come in contact with the butterfly valves 12, to prevent excessive rotations of the shaft 15 and the butterfly valves 12.

An operation of the variable air induction apparatus 10, which has the above-described construction, is described in the following.

While the butterfly valves 12 are closing the second air intake passages 22, the first air intake passages 21 are opened. Thus, the intake air introduced from the air inlet 13 flows through the first air intake passages 21 outward to the air outlet 14. At this time, the butterfly valves 12, which are closing the second air intake passages 22, are subjected to a force due to a pressure fluctuation of the intake air flown into the second air intake passages 22 in addition to a force due to a pressure fluctuation of the intake air flowing through the first air intake passages 21. Accordingly, the butterfly valves 12, which are closing the second air intake passages 22, are subjected to the force due to the pressure fluctuation of the intake air in the second air intake passage 22 to a side to open the second air intake passage 22, i.e., to rotate clockwise in FIG. 2.

At this time, the spring 42 exerts its urging force onto the shaft 15. Thus, when the butterfly valves 12 open the first air intake passages 21 and close the second air intake passages 22, the spring 42 exerts its urging force onto the shaft 15 as shown in FIG. 4 to keep the angle of the butterfly valves 12. Accordingly, the butterfly valves 12 are pushed onto the stoppers 24, not to open the second air intake passages 22 even if the butterfly valves 12 are subjected to the force due to the pressure fluctuation of the intake air in the second air intake passages 22. As a result, the butterfly valves 12, which are closing the second air intake passages 22, do not vibrated by the pressure fluctuation of the intake air. Further, at this time, the butterfly valves 12 are pushed by the urging force of the spring 42 onto the stoppers 24. Thus, while the butterfly valves 12 are closing the second air intake passages 22, it is not necessary to apply a driving force from the actuator 30 to the shaft 15 to push the butterfly valves 12 onto the stoppers 24. As a result, it is not necessary to energize the actuator 30 while the butterfly valves 12 keep closing the second air intake passages 22.

When the butterfly valves 12 move from the angle to close the second air intake passages 22 to the angle to close the first air intake passages 21, the actuator 30 applies its driving force to the shaft 15, to move the butterfly valves 12 to the side of the first air intake passages 21 against the urging force of the spring 42. At this time, when the butterfly valves 12 are rotated approximately to the midpoint between the angle to close the second air intake passages 22 and the angle to close the first air intake passages 21, the urging force of the spring 42 acting onto the shaft 15 is reversed as shown in FIG. 4. Accordingly, after the butterfly valves 12 are rotated to the midpoint by applying the driving force from the actuator 30 to the shaft 15, the urging force of the spring 42 acts onto the shaft 15, to rotate the butterfly valves 12 to the side of the first air intake passages 21. Then, the contact of the butterfly valves 12 with the stoppers 23 stops the rotation of the butterfly valves 12. As a result, the first air intake passages 21 are closed, and the second air intake passages 22 are opened.

While the butterfly valves 12 are closing the first air intake passages 21, the second air intake passages 22 are opened. Thus, the intake air introduced from the air inlet 13 flows through the second air intake passages 22 outward to the air outlet 14. At this time, the butterfly valves 12, which are closing the first air intake passages 21, are subjected to a force due to a pressure fluctuation of the intake air flowing into the first air intake passage 21, in addition to a force due to a pressure fluctuation of the intake air flowing through the second air intake passage 22. Accordingly, the butterfly valves 12, which are closing the second air intake passages 22, are subjected to the force due to the pressure fluctuation of the intake air in the second air intake passage 22 to a side to open the first air intake passage 21, i.e., to rotate counterclockwise in FIG. 2.

At this time, the spring 42 exerts its urging force onto the shaft 15. Thus, when the butterfly valves 12 open the second air intake passages 22 and close the first air intake passages 21, the spring 42 exerts its urging force onto the shaft 15 as shown in FIG. 4 to keep the angle of the butterfly valves 12. Accordingly, the butterfly valves 12 are pushed onto the stoppers 23, not to open the first air intake passages 21 even if the butterfly valves 12 are subjected to the force due to the pressure fluctuation of the intake air in the first air intake passages 21. As a result, the butterfly valves 12, which are closing the first air intake passages 21, do not vibrated by the pressure fluctuation of the intake air. Further, at this time, the butterfly valves 12 are pushed by the urging force of the spring 42 onto the stoppers 23. Thus, while the butterfly valves 12 are closing the second air intake passages 22, it is not necessary to apply a driving force from the actuator 30 to the shaft 15 to push the butterfly valves 12 onto the stoppers 23. As a result, it is not necessary to energize the actuator 30 while the butterfly valves 12 keep closing the first air intake passages 21.

As described above, in the variable air induction apparatus 10 according to the first embodiment, the spring 42 urges the shaft 15 that rotates integrally with the butterfly valves 12. The spring 42 has the characteristics of the urging force, which is reversed at the midpoint of the traveling range of the butterfly valves 12 as shown in FIG. 4. Thus, while the butterfly valves 12 are closing either of the first air intake passages 21 and the second air intake passages 22, the spring 42 applies the force onto butterfly valves 12 keep the closure. Accordingly, the driving force applied from the actuator 30 to the shaft 15 is reduced. Further, it is not necessary to keep applying the driving force at all times from the actuator 30 to the shaft 15 in order to maintain the closure of the first air intake passages 21 or the second air intake passages 22. As a result, an output force of the actuator 30 is reduced. Thus, even in the variable air induction apparatus 1 that has the cantilever butterfly valves 12, it is possible to downsize the actuator 30 and to decrease electricity consumption in the actuator 30.

Further, in the variable air induction apparatus 10 according to the first embodiment, the butterfly valves 12 have cantilever constructions. Thus, while the butterfly valves 12 are opening ones of the first air intake passages 21 and the second air intake passage 22, the butterfly valves 12 securely close the others of them. Accordingly, the intake air flow is securely switched to either of the first air intake passages 21 and the second air intake passages 22. As a result, the engine is supplied with the intake air that includes an appropriate decree of pressure fluctuation, so that it is possible to improve the output power of the engine.

(Second Embodiment)

Figure 5:
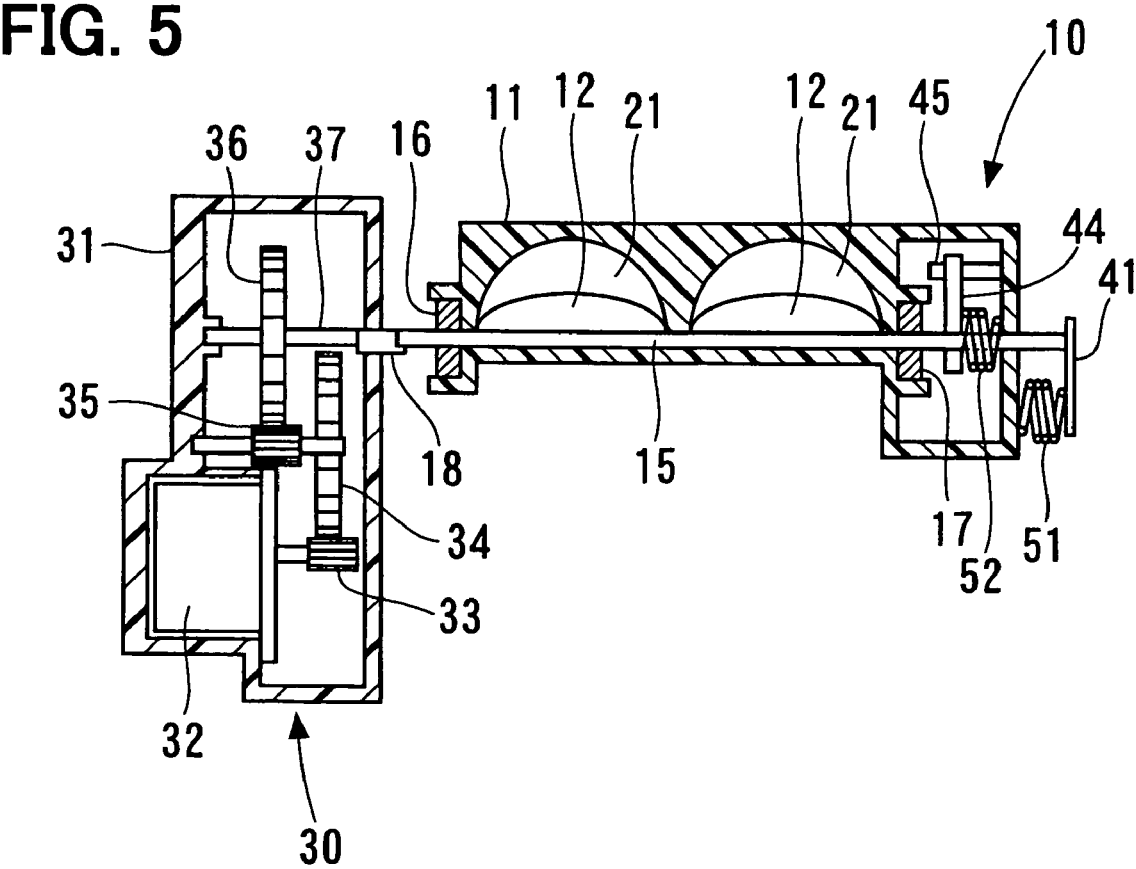
FIG. 5 is a cross-sectional view schematically showing a variable air induction apparatus according to a second embodiment of the present invention, which is taken along the line I—I of FIG. 2.

FIG. 5 depicts a variable air induction apparatus 10 according to a second embodiment of the present invention. Components substantially as same as those in the first embodiment are assigned the same referential numerals as in the first embodiment, and not especially described in the following.

Figure 6:
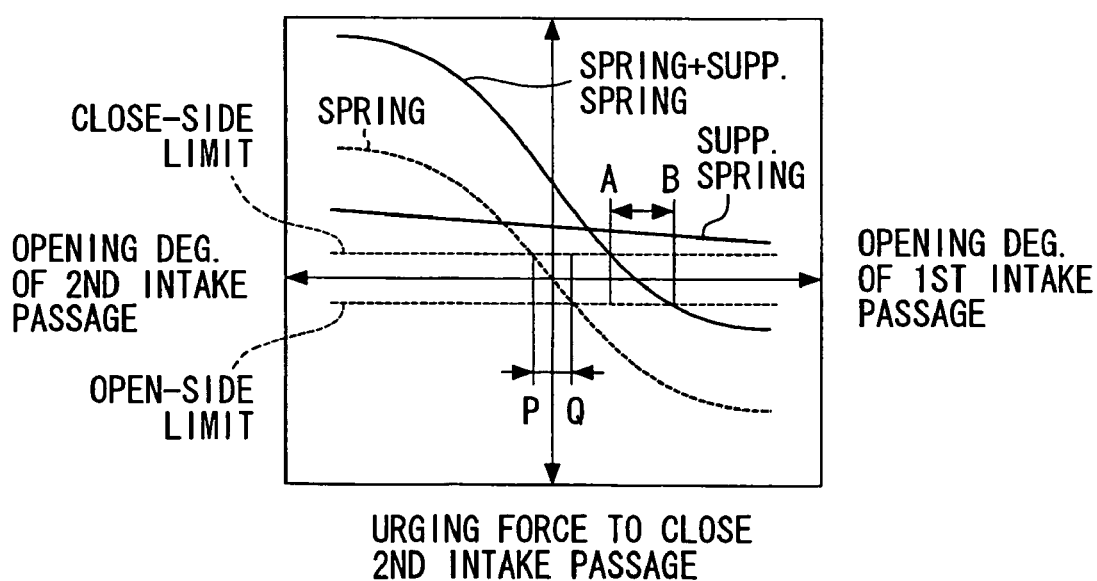
FIG. 6 is a graph schematically showing a relation between urging forces of a spring and a supplemental spring and an opening degree of a butterfly valve of the variable air induction apparatus according to the second embodiment.

As shown in FIG. 5, in the variable air induction apparatus 10 according to the second embodiment, the shaft 15 is urged not only by the spring 51, which corresponds to the urging device and the urging means according to the present invention, but also a supplemental spring 52, which corresponds to the supplemental urging device according to the present invention. As shown in FIG. 6, the spring 51 has urging force characteristics as same as that in the first embodiment. The supplemental spring 52 assists the urging force of the spring 51 exclusively to one side. Accordingly, as shown in FIG. 6, a resultant force of the urging force of the spring 51 and the urging force of the supplemental spring 52 strongly closes the first air intake passages 21 than only the urging force of the spring 51. Alternatively, the urging force of the supplemental spring 52 may be configured so that the resultant force of the urging force of the spring 51 and the urging force of the supplemental spring 52 strongly closes the second air intake passages 22 than only the urging force of the spring 51. The supplemental spring 52 increases the urging force of the spring 51 to the side to close the first air intake passages 21, so that the urging force applied onto the shaft 15 is biased.

The variable air induction apparatus 10 has friction resistances between the teeth of the gears 34, 35, 36 of the actuator 30, between the shaft 15 and the bearings 16, 17, etc. Thus, in a condition that the butterfly valves 12 are at an intermediate angle between the angle to open the first air intake passages 21 and the angle to open the second air intake passages 22, when the force acting onto the butterfly valves 12 becomes larger than a closing side limit of the friction resistances, the butterfly valves 12 rotate to the side to close the first air intake passages 21, i.e., to the side to open the second air intake passages 22. Further, in the condition that the butterfly valves 12 are at the intermediate angle, when the force acting onto the butterfly valves 12 becomes larger than an opening side limit of the friction resistances, the butterfly valves 12 rotate to the side to open the first air intake passages 21, i.e., to the side to close the second air intake passages 22. When the force acting onto the butterfly valves 12 is between the closing side limit and the opening side limit of the friction resistances, the friction resistances prevents the butterfly valves 12 from rotating even when a force acts onto the butterfly valves 12.

If the engine is stopped when the butterfly valves 12 are in contact with the stoppers 23 or the stoppers 24, for example, the butterfly valves 12 keep in contact with the stoppers 23 or the stoppers 24. At this time, the butterfly valves 12 may be adhered onto the stoppers 23 or the stoppers 24 due to a temperature decrease around the vehicle that installs the engine therein, foreign matters that are stuck in proximity to the stoppers 23 or the stoppers 24, etc. If the butterfly valves 12 are adhered onto the stoppers 23 or the stoppers 24, the butterfly valves 12 cannot rotate. Thus, it is desirable that the butterfly valves 12 are kept apart from the stoppers 23 and the stoppers 24 while the engine is stopped.

In a case that only the spring 51 is provided in the variable air induction apparatus 10, the urging force acting onto the butterfly valves 12 becomes zero when the butterfly valves 12 are approximately at the midpoint between the angle to close the first air intake passages 21 and the angle to close the second air intake passages 22. The urging force characteristics of the spring 51 have a large gradient, i.e., a large spring coefficient at a proximity to a point at which the urging force is zero. Thus, an allowable traveling range of the butterfly valves 12 between the closing side limit and the opening side limit of the friction resistances is small, which is between P and Q in FIG. 6. As a result, if the butterfly valves 12 are slightly moved from the angle at which the urging force is zero, the urging force of the spring 51 becomes larger than the closing side limit or the opening side limit of the friction resistance acting onto the butterfly valves 12. When the urging force of the spring 51 acting onto the butterfly valves 12 becomes larger than the closing side limit or the opening side limit of the friction resistance, the urging force of the spring 51 rotates the butterfly valves 12 to the side of the stoppers 23 or to the side of the stoppers 24. As a result, even when the butterfly valves 12 are at the intermediate angle while the engine is stopped, if the butterfly valves 12 are slightly moved by a vibration of the variable air induction apparatus 10, etc., the urging force of the spring 51 rotates the butterfly valves 12 to the angle to come in contact with the stoppers 23 or the stoppers 24.

In the variable air induction apparatus 10 according to the second embodiment, the supplemental spring 52 urges the shaft 15 as shown in FIG. 6. Thus, the resultant force of the urging force of the spring 51 and the urging force of the supplemental spring 52 is biased to the side for the butterfly valves 12 to close the first air intake passages 21. Accordingly, the resultant force of the urging force of the spring 51 and the urging force of the supplemental spring 52 becomes zero when the butterfly valves 12 is at an angle to open the first air intake passages 21. Thus, the urging force characteristics have a relatively small gradient, i.e., a relatively small spring coefficient between the closing side limit and the opening side limit of the friction resistance. As a result, the allowable traveling range of the butterfly valves 12 is increased to be a range between A and B in FIG. 6, relative to a case that only the spring 51 urges the shaft 15. Thus, when the butterfly valves 12 is stopped in proximity to an angle at which the resultant force of the urging force of the spring 51 and the urging force of the supplemental spring 52 becomes zero, the friction resistance acting onto the butterfly valves 12 remains larger than the urging force of the spring 51 and the urging force of supplemental spring 52 even if the butterfly valves 12 are slightly moved. Accordingly, when the traveling amount of the butterfly valves 12 is relatively small, the butterfly valves 12 are kept apart from the stoppers 23 and the stoppers 24.

When the engine 10, which incorporates the variable air induction apparatus 10 therein, is stopped, the actuator 30 rotates the butterfly valves 12 approximately to an angle at which the resultant force of the urging forces of the spring 51 and the supplemental spring 52 becomes zero. Thus, the butterfly valves 12 are kept apart from the stoppers 23 and the stoppers 24 without being provided with the driving force from the actuator 30.

In the variable air induction apparatus 10 according to the second embodiment, the supplemental spring 52 assists the urging force of the spring 51, to change the urging force characteristics to urge the shaft 15. Thus, the butterfly valves 12 are easily kept between the closing side limit and the opening side limit of the friction resistances, so that it becomes easy to keep the butterfly valves 12 apart from the stoppers 23 and the stoppers 24. Accordingly, the butterfly valves 12 keeps apart from the stoppers 23 and the stoppers 24 without being provided with the driving force thereto from the actuator 30. Thus, the butterfly valves 12 do not rotate to the side of the stoppers 23 and to the side of the stoppers 24, without applying the driving force from the actuator 30 to the butterfly valves 12 and even if the butterfly valves 12 are subjected to slight vibrations. Accordingly, the butterfly valves 12 are securely prevented from adhering onto the stoppers 23, 24 without increasing electricity consumption of the actuator 30.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A variable air induction apparatus comprising:
    a housing in which a first air intake passage and a second air intake passage are formed, the first air intake passage and the second air intake passage having lengths different from each other;
    a shaft member that rotates about a longitudinal axis thereof;
    a valve element that is fixed on the shaft member to rotate integrally with the shaft member to be switched between one side to open the first air intake passage and close the second air intake passage and the other side to open the second air intake passage and to close the first air intake passage;
    a driving device that applies a driving force to rotate the shaft member;
    an urging device that urges the shaft member to rotate the valve element to be switched to any one of the one side and the other side.

2. The variable air induction apparatus according to claim 1, wherein the urging device urges the shaft member to keep the valve element closing the first air intake passage when the valve element substantially closes the first air intake passage and opens the second air intake passage, and to keep the valve element closing the second air intake passage when the valve element substantially closes the second air intake passage and opens the first air intake passage.

3. The variable air induction apparatus according to claim 1, further comprising a supplemental urging device that urges the shaft member to rotate the valve element to the one side.

4. The variable air induction apparatus according to claim 3, wherein a resultant force of urging forces of the urging device and the supplemental urging device becomes neutral not to urge the shaft member at a rotational position of the shaft member at which the valve element opens the first air intake passage.

5. A variable air induction apparatus comprising:
    a housing in which a first air intake passage and a second air intake passage are formed, the first air intake passage and the second air intake passage having lengths different from each other;
    a shaft member that rotates about a longitudinal axis thereof;
    a valve element that is fixed on the shaft member to rotate integrally with the shaft member to be switched between one side to open the first air intake passage and close the second air intake passage and the other side to open the second air intake passage and to close the first air intake passage;
    a driving means for applying a driving force to rotate the shaft member;
    an urging means for urging the shaft member to rotate the valve element to be switched to any one of the one side and the other side.

* * * * *